United States Patent [19]

Jung

[11] Patent Number: 5,735,382
[45] Date of Patent: Apr. 7, 1998

[54] SETSCREW FEEDING APPARATUS

[75] Inventor: Jong-Kun Jung, Seoul, Rep. of Korea

[73] Assignee: Daewoo Electronics, Co., Ltd., Rep. of Korea

[21] Appl. No.: 645,884

[22] Filed: May 14, 1996

[30] Foreign Application Priority Data

May 18, 1995 [KR] Rep. of Korea ............... 95-12338

[51] Int. Cl.$^6$ ............................................... B65G 47/24
[52] U.S. Cl. ........................................ 198/399; 198/400
[58] Field of Search ................................ 198/382, 383, 198/398, 399, 400

[56] References Cited

U.S. PATENT DOCUMENTS

| 3,035,681 | 5/1962 | Bennett | 198/399 |
| 3,517,795 | 6/1970 | Dixon | 198/400 X |
| 4,802,568 | 2/1989 | Haarer et al. | 198/399 X |
| 4,818,381 | 4/1989 | Tanaka et al. | 198/399 X |
| 5,236,078 | 8/1993 | Gross et al. | 198/399 X |
| 5,255,775 | 10/1993 | Buehren et al. | 198/400 X |

FOREIGN PATENT DOCUMENTS

| 0037016 | 2/1988 | Japan | 198/399 |
| 1380901 | 3/1988 | U.S.S.R. | 198/399 |

*Primary Examiner*—James R. Bidwell
*Attorney, Agent, or Firm*—Pennie & Edmonds LLP

[57] ABSTRACT

An apparatus for feeding a setscrew having a recess includes an upper and a lower guide pipes, an inner cylindrical member, a supporting shaft, an outer cylindrical member and a dispensing member. The upper guide pipe is disposed between a setscrew supplier and the outer cylindrical member, while the lower guide pipe between the outer cylindrical and a setscrew fitting machine. The inner cylindrical member is inserted into a cavity of the outer cylindrical member in such a way that a first guide hole thereof is disposed in communication with a second guide hole of the outer cylindrical member. A pin, which extends radially inwardly in the cavity, is fitted into a circumferential groove of the inner cylindrical member and moves along it during the rotation of the outer cylindrical member. The outer cylindrical member is rotatably fixed onto the supporting shaft at one end and the other end is coupled to a rotating means. The dispensing member is biased by a spring, thereby preventing the setscrew from dropping. When the outer cylindrical rotates by 180 degrees, a protrusion of an extending portion of the outer cylindrical member urges the dispensing member against the biasing force, thereby allowing the setscrew to drop into the first guide hole one at a time.

7 Claims, 7 Drawing Sheets

SETSCREW FEEDING APPARATUS

FIELD OF THE INVENTION

The present invention relates to a setscrew feeding apparatus; and, more particularly, to an apparatus capable of feeding automatically and efficiently a plurality of setscrews, with their recesses opened upwardly.

DESCRIPTION OF THE PRIOR ART

Generally, a setscrew provided with a polygonal, e.g., hexagonal, recess for receiving a wrench which is adapted to rotate it is used for, e.g., adjusting and setting a position of a head incorporated in a head drum of a video cassette recorder. Since the setscrew used in the head drum is very small, it is desirable to feed it automatically to, e.g., a setscrew fitting machine, with the recess opened upwardly to receive the wrench.

There is shown in FIGS. 1 and 2 a conventional apparatus for automatically feeding a plurality of setscrews to the setscrew fitting machine.

The conventional apparatus includes a rotary member 40 provided with a plurality of pins 41 which are formed in two rows on a circumferential surface thereof and extend radially outwardly, a pair of hoses 60, a bracket 50 for holding the hoses 60, and a supplier 10 having a guide rail 11.

An inlet of each hose 60 is held by the bracket 50 in the vicinity of the rotary member 40 and an outlet thereof is connected to the setscrew fitting machine (not shown).

The setscrews S in the supplier 10 are carried through the guide rail 11 toward the rotary member 40 and fitted onto a pair of pins 41 one or two at a time. The rotary member 40, then, rotates at a certain pitch and the following setscrew S is, in sequence, fitted onto the following pin 41, and so on. When the setscrew S fitted onto the pin 41 is rotated by 180 degrees and is situated at the position adjacent to the inlet of the hose 60, it is inhaled into the hose by a suction force and fed to the setscrew fitting machine.

However, in such a conventional apparatus, since the setscrews S are stored in the supplier 10 in a disorderly fashion, the probability for one of the setscrews S fitting onto the pin 41 is approximately one half, resulting in a low feeding efficiency.

SUMMARY OF THE INVENTION

It is, therefore, a primary object of the invention to provide an apparatus capable of automatically feeding the setscrews at an increased efficiency.

In accordance with one aspect of the present invention, there is provided an apparatus for feeding a setscrew having a recess, the apparatus comprising: a supplier provided with guide rail; means for feeding the setscrew one at a time, with the recess opened upwardly; an upper guide pipe whose inlet is disposed immediately under a terminal of the guide rail and whose outlet is disposed immediately above the setscrew feeding means so that the setscrew leaving the guide rail is delivered into the setscrew feeding means therethrough; and a lower guide pipe whose inlet is disposed immediately under the setscrew feeding means opposite to the upper guide pipe so that the setscrew is dropped thereinto.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
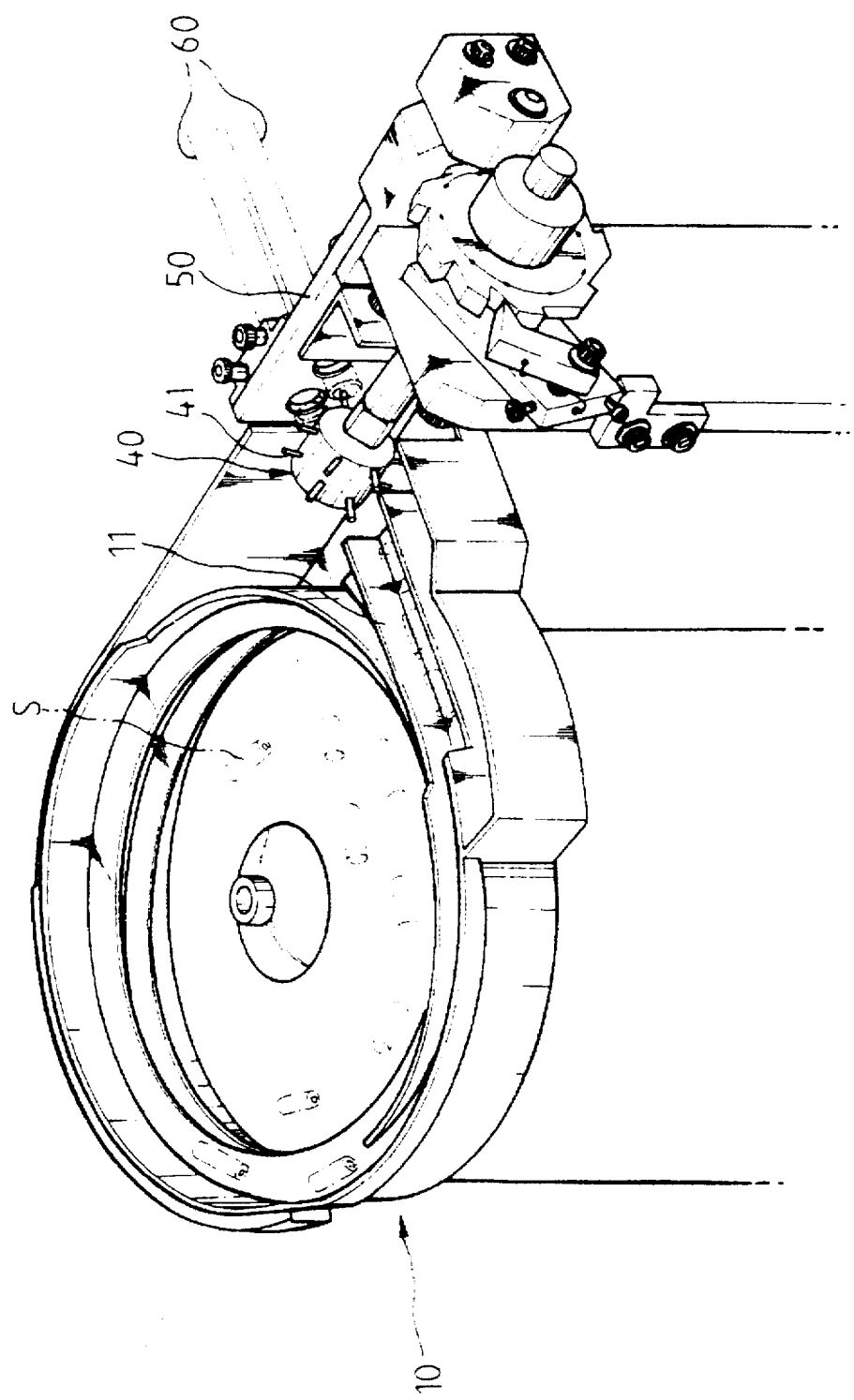
FIGS. 1 and 2 represent a perspective and a detailed views of a conventional setscrew feeding apparatus, respectively.
Figure 2:
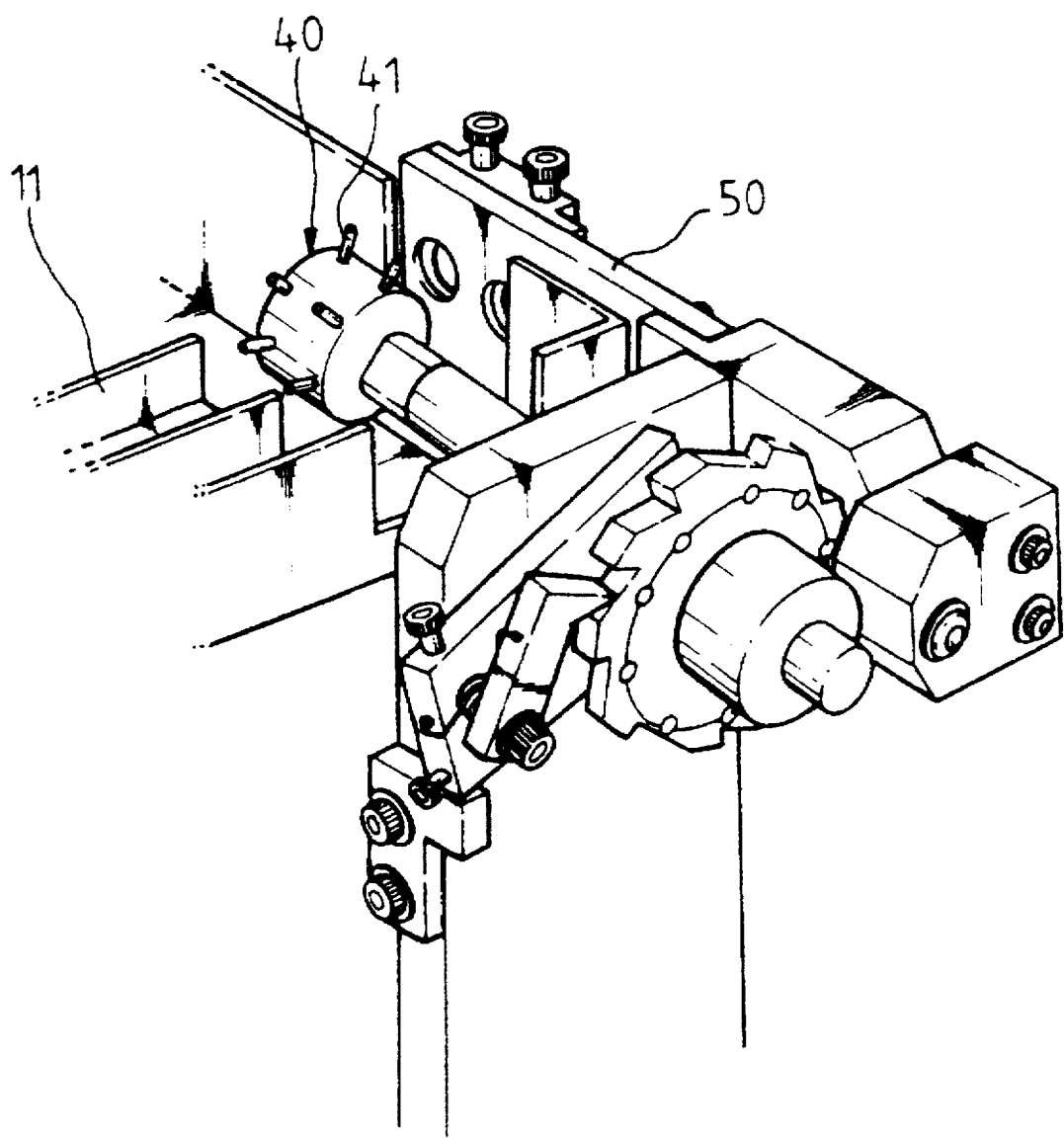
Figure 3:
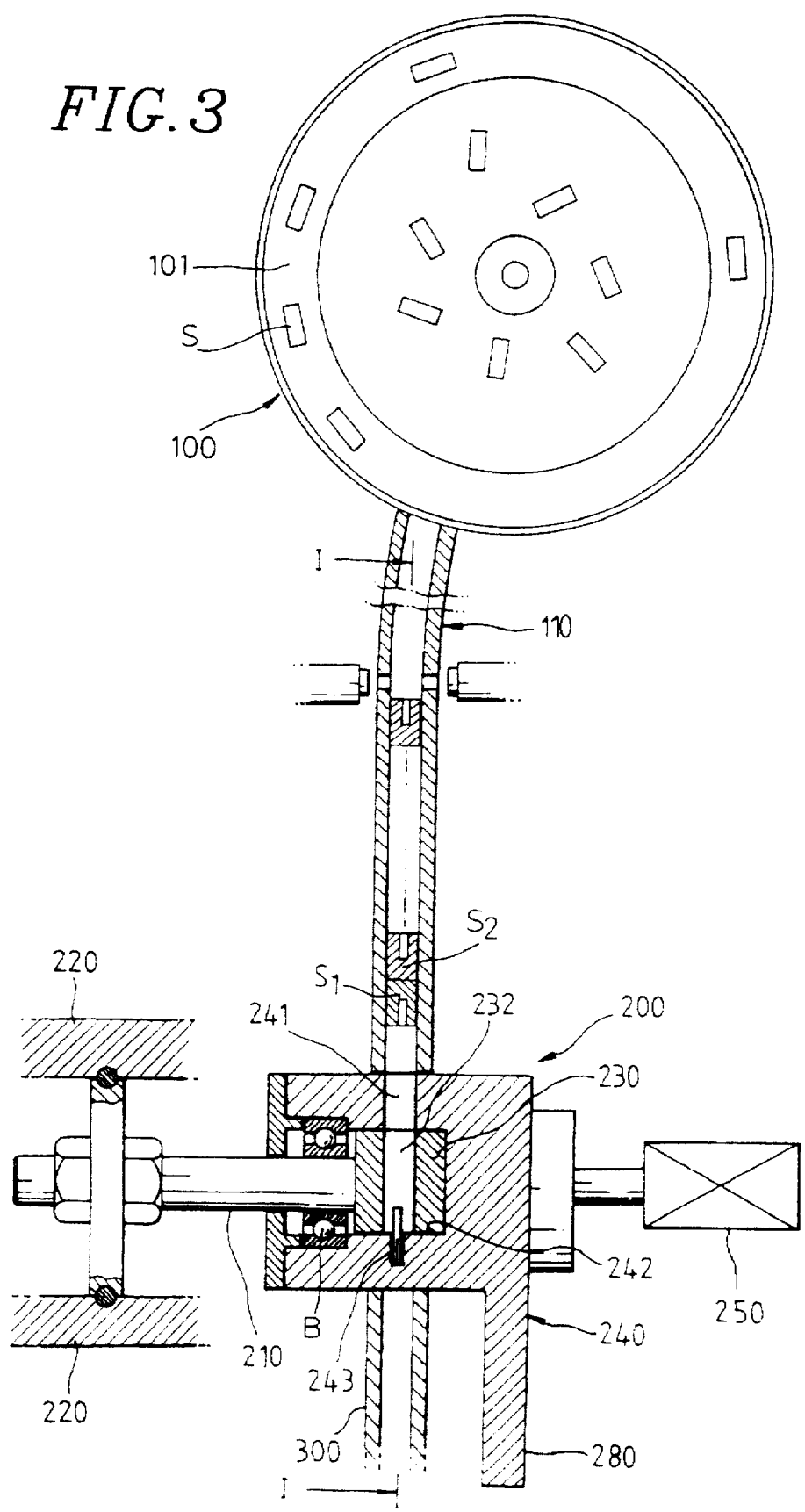
FIG. 3 illustrates a schematic cross-sectional view of a setscrew feeding apparatus in accordance with a preferred embodiment of the present invention, including a schematic top view of the supplier.

There is shown in FIG. 3 a schematic cross-sectional view of an apparatus for feeding a setscrew having a recess in accordance with a preferred embodiment of the present invention. The setscrew feeding apparatus comprises a supplier 100 having a guide rail 101, an upper guide pipe 110, a means 200 for feeding the setscrew to a setscrew fitting machine (not shown) one at a time, with the recess opened upwardly, and a lower guide pipe 300.

Figure 4:
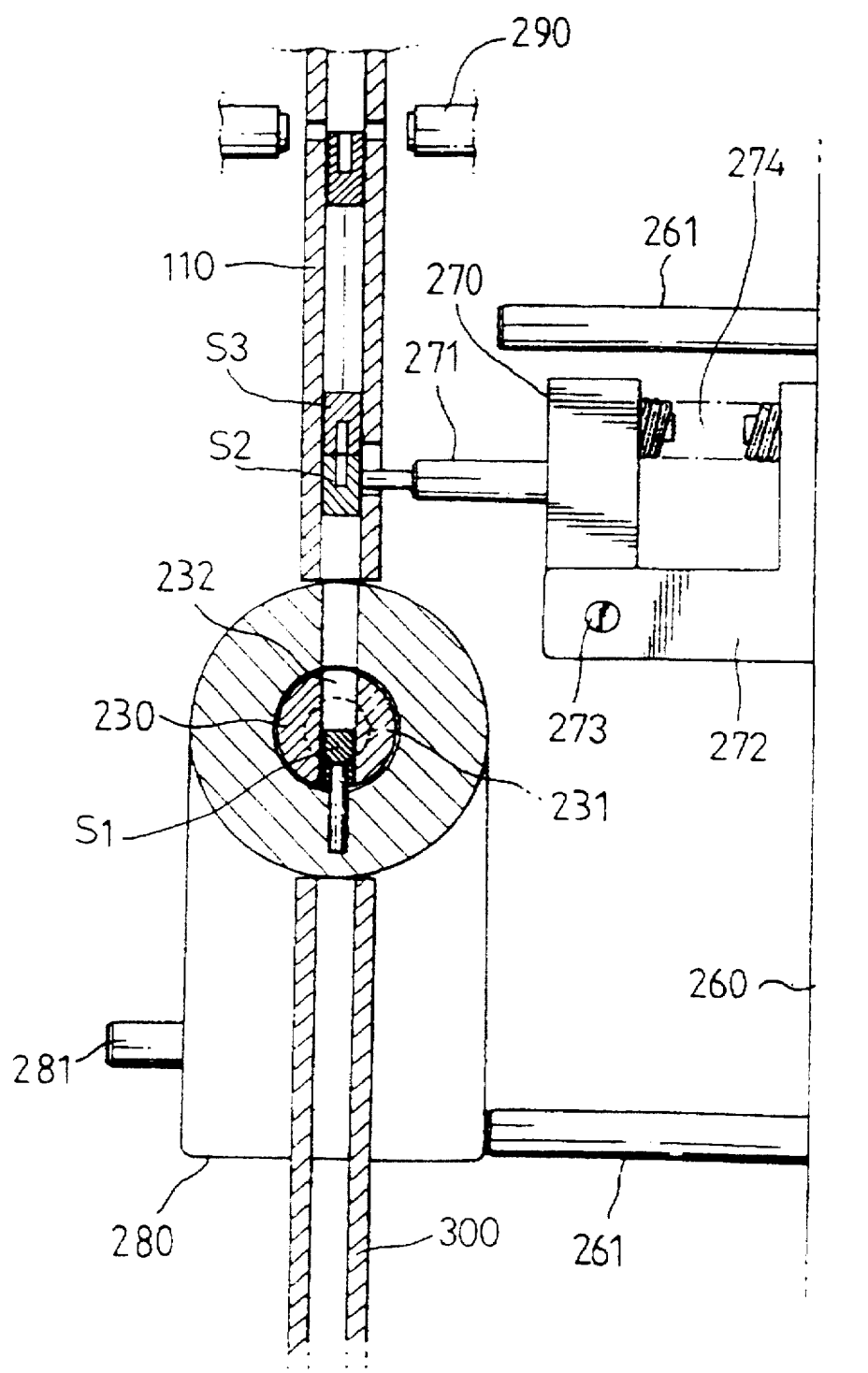
FIGS. 4 to 7 show cross-sectional views taken along the line I—I of FIG. 3, setting forth the setscrew feeding steps.

As shown in FIGS. 3 and 4, the set screw feeding means 200 includes a supporting shaft 210, an inner cylindrical member 230, an outer cylindrical member 240, a rotating means, e.g., a motor 250, and a dispensing member 270.

The supporting shaft 210 is rotatably supported at one end by a bracket 220 which is fixed to a main body (not shown) and the other end is connected to the inner cylindrical member 230. The supporting shaft 210 and the inner cylindrical member 230 may be made in one piece. The inner cylindrical member 230 is provided with a groove 231 and a first guide hole 232. The groove 231 is formed on a circumferential surface of the inner cylindrical member 230 and has a depth less than the height of the setscrew S. The first guide hole 232 is formed in the groove 231 and radially passes through the inner cylindrical member 230.

The outer cylindrical member 240 is provided with a cavity 242 having a predetermined depth, a second guide hole 241, a pin 243 adapted to be inserted into the recess of the setscrew S, and an extending portion 280. The second guide hole 241 radially extends from the circumferrential surface of the outer cylindrical member 240 to be in communication with the cavity 242. The pin 243 is fixed to the outer cylindrical member 240 opposite to the second guide hole 241 and extends radially inwardly in the cavity 242. The extending portion 280 extends radially downwardly and is provided with a protrusion 281 which extends in a lateral direction for urging the dispensing member 270 when the extending portion 280 is rotated by 180 degrees and located at a top position (see FIGS. 4 and 5).

The inner cylindrical member 230 is inserted into the cavity 242 in such a way that the first and the second guide holes 232, 241 coincide with each other, being opened upwardly, and the pin 243 is fitted into the groove 231 and moves along it during the rotation of the outer cylindrical member 240. The outer cylindrical member 240 is rotatably fixed onto the supporting shaft 210 through a bearing B at one end and the other end is coupled to the rotating means 250. The rotating means 250 alternately rotates the outer cylindrical member 240 clockwise and counterclockwise by 180 degrees.

On the other hand, an inlet of the upper guide pipe 110 is disposed immediately under an exit terminal of the guide rail 101 so that the setscrews S leaving the guide rail 101 drop into the upper guide pipe 110, and an outlet thereof is disposed immediately above and in communication with the second guide hole 241. In addition, an inlet of the lower guide pipe 300 is disposed immediately under the outer cylindrical member 240 opposite to the upper guide pipe 110.

The dispensing member 270 is provided with a post 271 which extends toward the upper guide pipe 110, and is rotatably supported through a hinge 273 by an L-shaped base 272 which is fixed to a frame 260. The dispensing member 270 is biased by an elastic member, e.g., spring 274 which is interposed between the dispensing member 270 and the base 272 so that the post 271 fits through an aperture of the upper pipe 110 and bears on an opposite side wall of the upper guide pipe 110, thereby preventing the setscrew from dropping downwardly when it is in position.

Furthermore, in order to restrict the range of the rotation of the outer cylindrical member 240 to 180 degrees, a pair of stoppers 261 which are spaced apart from each other at a desired distance may be fixed on the frame 260.

Disposed in the vicinity of an upper portion of the upper guide pipe 110 is a sensor 290 for checking whether or not the upper guide pipe 110 is fully-filled with the setscrews S. The supplier 100 is activated or deactivated in response to a signal from the sensor 290, i.e., it is deactivated and stops feeding the setscrews S into the upper guide pipe 110 if the latter is determined to be fully-filled with the setscrews S.

The operation of the setscrew feeding apparatus in accordance with the present invention will now be described.

Figure 5:
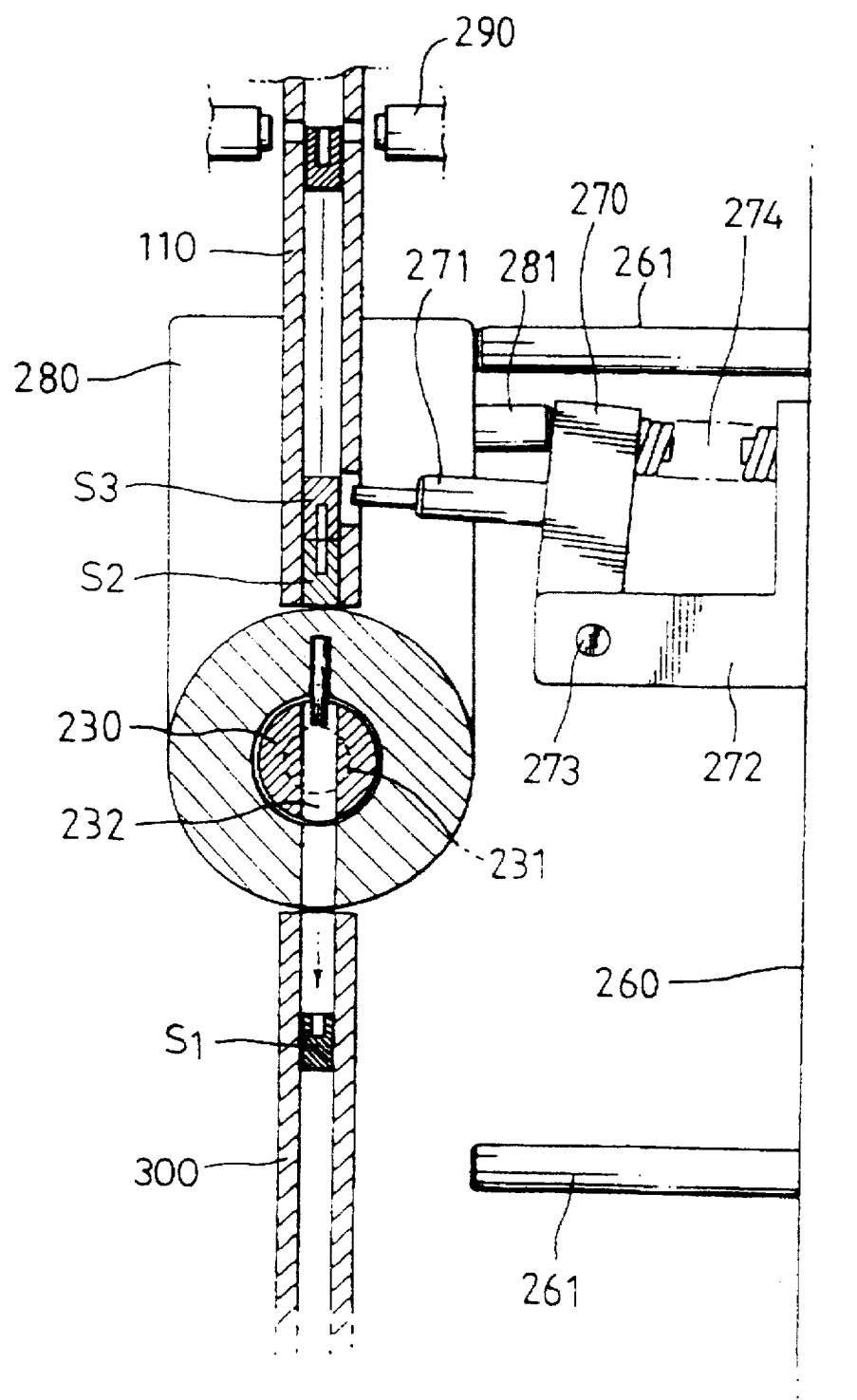

First, as shown in FIG. 3, the setscrews S in the supplier 100 are carried through the guide rail 101 into the upper guide pipe 110 one by one, and are stacked therein as a result of the post 271 of the dispensing member 270 preventing the setscrews S from dropping into the first and the second guide holes 232, 241. When the outer cylindrical member 240 rotates by 180 degrees clockwise, the protrusion 281 of the protruding portion 280 urges the dispensing member 270 to the right, as shown in FIG. 5, against the biasing force of the spring 274 so that the stacked setscrews are allowed to move downwardly together and the lowest setscrew S1 is situated on the circumferential surface of the outer cylindrical member 240. Subsequently, the outer cylindrical member 240 rotates counterclockwise and the post 271 presses the next setscrew S2 against the opposite side wall of the upper guide pipe 110, thereby preventing the remaining setscrews from dropping. When the outer cylindrical member 240 rotates by 180 degrees, the second guide holes 241 is located between and in communication with the upper guide pipe 110 and the first guide hole 232 so that the setscrew S1, which is situated on the circumferential surface of the outer cylindrical member 240, drops into the first guide hole 232 via the second guide hole 241.

Referring to FIGS. 4 and 5, the feeding of the setscrew S1 when it has dropped into the first guide hole 232, with its recess opened downwardly, will be described. The setscrew S1 is fitted onto the pin 243 through the recess as shown in FIG. 4. While the outer cylindrical member 240 is rotated clockwise by the rotating means 250, the pin 243 presses the setscrew S1 against the inner cylindrical member 230 and transfers the rotational force of the outer cylindrical member 240 to the inner cylindrical member 230 and the setscrew S1 so that they rotate together with the outer cylindrical member 240. As shown in FIG. 5, if the outer cylindrical member 240 and the inner cylindrical member 230 rotate by 180 degrees and the first and the second guide holes 232, 241 are aligned in communication with the lower guide pipe 300, the rotating means 250 stops the cylindrical member 240 and the setscrew S1 in the first guide hole 232 drops into the lower guide pipe 300 to be fed to a setscrew fitting machine (not shown), with the recess thereof opened upwardly. At the same time, the protrusion 281 of the extending portion 280 urges the dispensing member 270 to the right, as shown in FIG. 5, against the biasing force of the spring 274 so that the setscrews restrained by the post 271 are released and the lowest setscrew S2 is dropped on the circumferential surface of the outer cylindrical member 240. Subsequently, only the outer cylindrical member 240 rotates counterclockwise and the post 271 back in position restrains the next setscrew S3. When the outer cylindrical member 240 rotates by 180 degrees clockwise, the second guide hole 241 is located between and in communication with the upper guide pipe 110 and the first guide hole 232 so that the setscrew S2 located on the circumferential surface of the outer cylindrical member 240 drops into the first guide hole 232 via the second guide hole 241.

Figure 6:
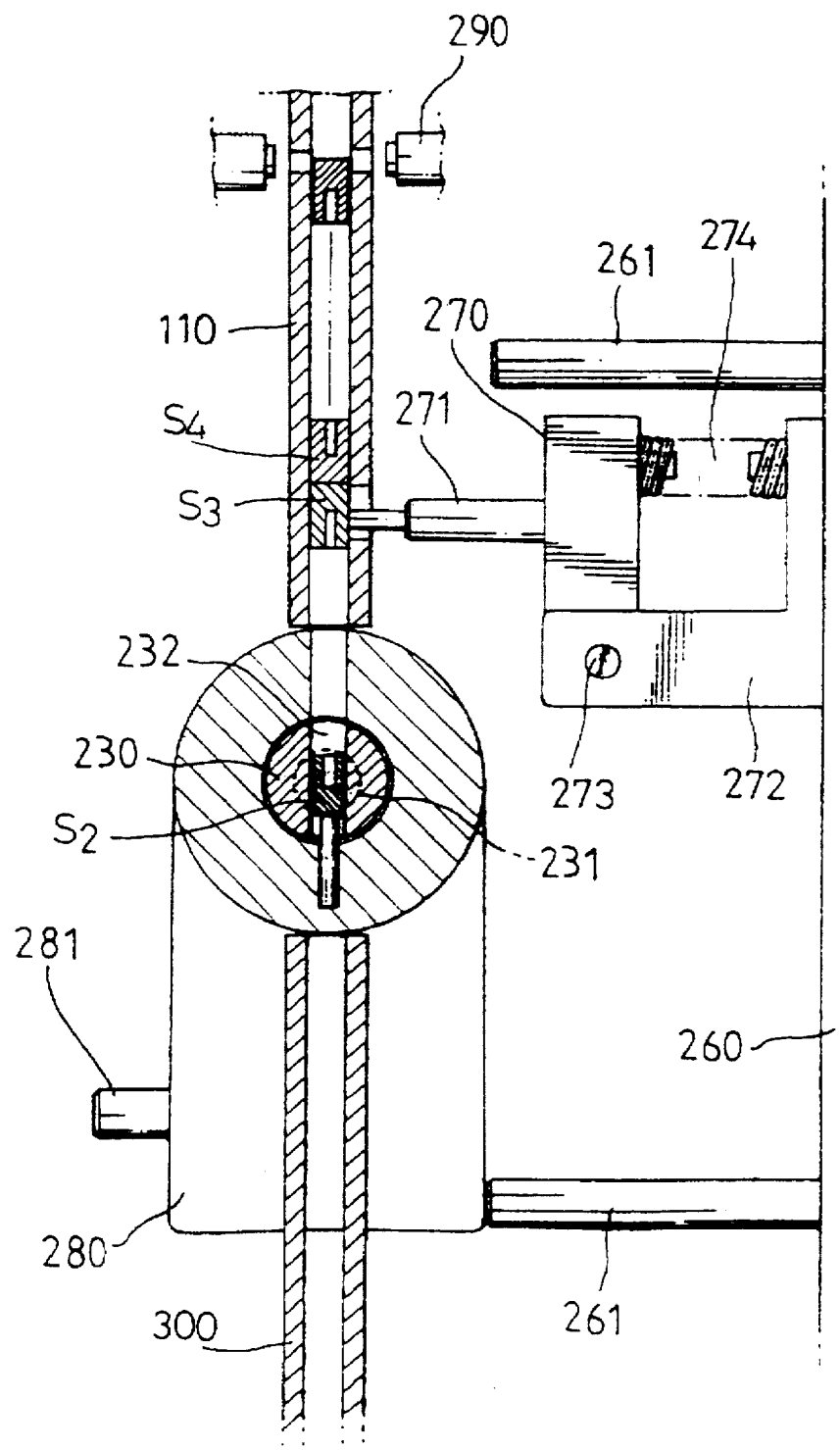
Figure 7:
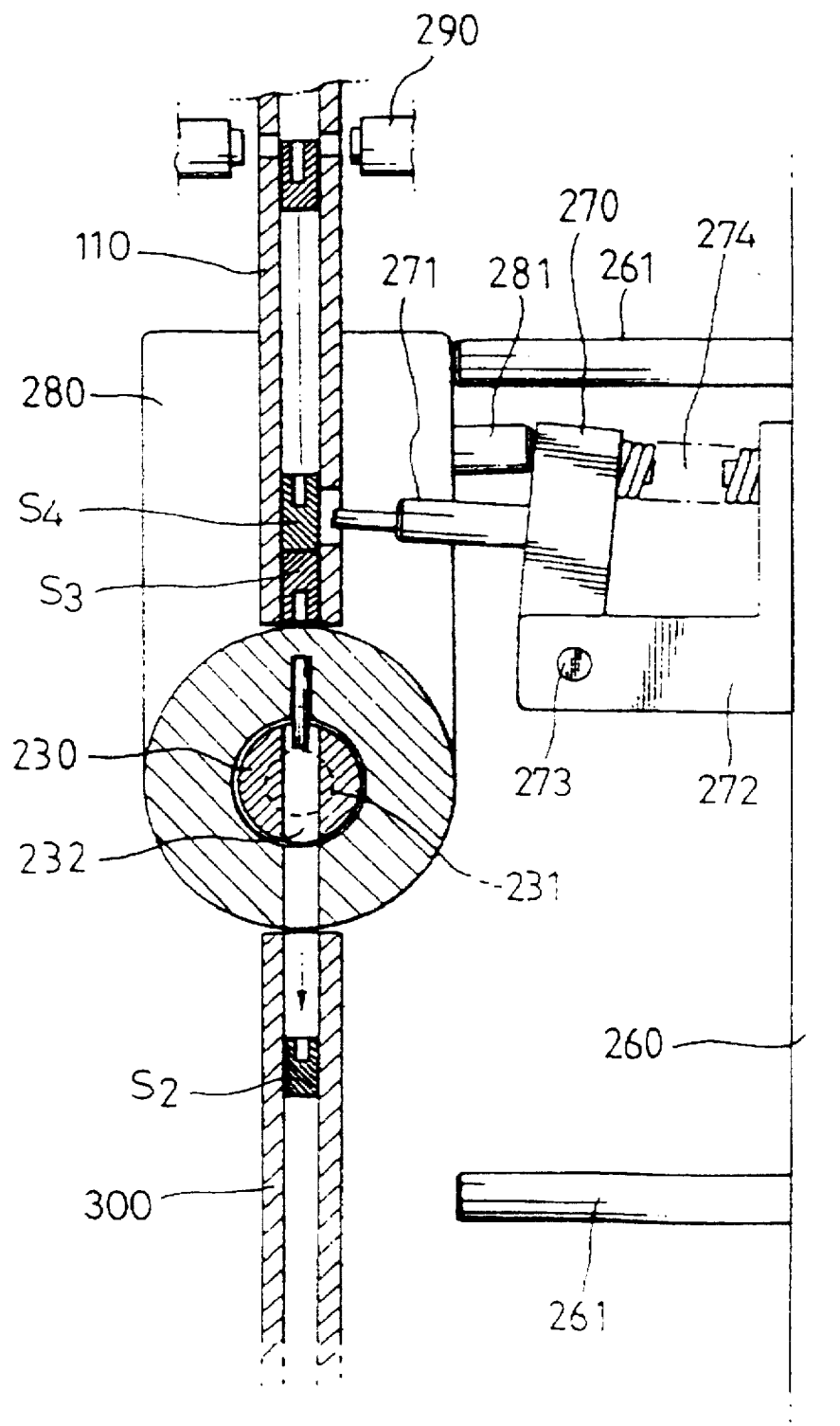

Referring now to FIGS. 6 and 7, the feeding of the setscrew S2 when it has dropped into the first guide hole 232, with its recess opened upwardly, will be described. The setscrew S2 is situated on a top of the pin 243 as shown in FIG. 6. As the outer cylindrical member 240 is rotated clockwise by the rotating means 250, the pin 243 moves along the guide groove 231 of the inner cylindrical member 230 and the setscrew S2 drops onto the inner surface of the outer cylindrical member 240. When the outer cylindrical member 240 rotates by 180 degrees and the second guide hole 241 is aligned between and in communication with the first guide holes 232 and the lower guide pipe 300, the setscrew S2 in the first guide hole 232 drops into the lower guide pipe 300 to be fed to the setscrew fitting machine, with its recess opened upwardly. At the same time, as similar to the above-described case, the protrusion 281 of the extending portion 280 urges the dispensing member 270 to the right, as shown in FIG. 7, against the biasing force of the spring 274 so that the setscrews restrained by the post 271 are released and drop so that the lowest setscrew S3 is situated on the circumferential surface of the outer cylindrical member 240. Subsequently, the outer cylindrical member 240 rotates counterclockwise and the post 271 restrains the next setscrew S4 to prevent the remaining setscrews from dropping. When the outer cylindrical member 240 rotates by 180 degrees counterclockwise, the second guide hole 241 is located between and in communication with the upper guide pipe 110 and the first guide hole 232, thereby allowing the setscrew S3, which is situated on the circumferential surface of the outer cylindrical member 240, to drop into the first guide hole 232 via the second guide hole 241.

In this way, the feeding of the setscrews S is automatically and continuously performed, with the recess of each setscrew opened upwardly.

Although the invention has been shown and described with respect to the preferred embodiments, it will be understood by those skilled in the art that various changes and modifications may be made without departing from the spirit and scope of the invention as defined in the following claims.

What is claimed is:

1. An apparatus for feeding a setscrew having a recess, the apparatus comprising:

a supplier provided with a guide rail;

means for feeding the setscrew one at a time, with the recess opened upwardly;

an upper guide pipe whose inlet is disposed immediately under a terminal of the guide rail and whose outlet is disposed immediately above the setscrew feeding means so that the setscrew leaving the guide rail is delivered into the setscrew feeding means therethrough; and a lower guide pipe whose inlet is disposed immediately under the setscrew feeding means opposite to the upper guide pipe; wherein said setscrew feeding means includes:

an inner cylindrical member provided with a groove which is formed on a circumferential surface thereof and a first guide hole which is formed in the groove and radially passes through the inner cylindrical member; and an outer cylindrical member provided with a cavity, a second guide hole radially extending to be in communication with the cavity, and a pin which is fixed to the outer cylindrical member opposite to the second guide hole and extends radially inward into the cavity, wherein the inner cylindrical member is disposed in the cavity in such a way that the first and the second guide holes are disposed in communication with each other and the pin is fitted into the groove, and the set screw feeding means is rotatable between a first position in which the first and second guide holes are in communication with the upper guide pipe, and a second position in which the first and second guide holes are in communication with the lower guide pipe, the pin moving along the groove as the set screw means is rotated between said first and second positions.

2. The apparatus of claim 1, further comprising a sensor for checking whether or not the upper guide pipe is fully-filled with the setscrews, the sensor being disposed in the vicinity of an upper portion of the upper guide pipe.

3. The apparatus of claim 1, further comprising a rotating means which alternately rotates the setscrew feeding means clockwise by 180 degrees from the first to the second position and counterclockwise by 180 degrees from the second position to the first position.

4. The apparatus of claim 1, wherein the outer cylindrical member further includes a radially extending portion provided with a protrusion extending in a lateral direction; and the apparatus further includes a dispensing member provided with a post which extends toward the upper guide pipe, the dispensing member being rotatably supported by a base, the dispensing member being biased by an elastic member which is interposed between the dispensing member and the base so that the post fits through an aperture of the upper pipe and presses the setscrew against the upper guide pipe, thereby preventing the setscrew from dropping downwardly when the setscrew feeding means is in the first position, upon moving the setscrew feeding means to the second position, the extending portion is situated at a top position so that the protrusion urges the dispensing member against the biasing force of the elastic member, thereby allowing the setscrew to drop into the first guide hole.

5. An apparatus for feeding a setscrew having a recess, the apparatus comprising:

a supplier provided with a guide rail;

means for feeding the setscrew one at a time, with the recess opened upwardly;

an upper guide pipe whose inlet is disposed immediately under a terminal of the guide rail and whose outlet is disposed immediately above the setscrew feeding means so that the setscrew leaving the guide rail is delivered into the setscrew feeding means therethrough; and a lower guide pipe whose inlet is disposed immediately under the setscrew feeding means opposite to the upper guide pipe so that the setscrew drops thereinto, wherein said setscrew feeding means includes:

an inner cylindrical member provided with a groove which is formed on a circumferential surface thereof and a first guide hole which is formed in the groove and radially passes through the inner cylindrical member;

a supporting shaft, one end of which is rotatably supported by a bracket and the other end thereof is connected to the inner cylindrical member;

an outer cylindrical member provided with a cavity, a second guide hole which radially extends from the circumferential surface thereof and radially extends to be in communication with the cavity, a pin which is fixed to the outer cylindrical member opposite to the second guide hole and extends radially inwardly in the cavity, and a radially extending portion provided with a protrusion extending in a lateral direction, the inner cylindrical member being inserted into the cavity in such a way that the first and the second guide holes are disposed in communication with each other, being opened upwardly, and the pin is fitted into the groove and moves along it during the rotation of the outer cylindrical member, the outer cylindrical member being rotatably fixed onto the supporting shaft at one end and the other end thereof being coupled to a rotating means which alternately rotates the outer cylindrical member clockwise and counterclockwise by 180 degrees; and a dispensing member provided with a post which extends toward the upper guide pipe, the dispensing member being rotatably supported by a base, the dispensing member being biased by an elastic member which is interposed between the dispensing member and the base so that the post fits through an aperture of the upper pipe and presses a setscrew against the upper guide pipe, thereby preventing the setscrew from dropping downwardly, the protrusion urging the dispensing member against the biasing force of the elastic member at an instant when the extending portion is situated at a top position, thereby allowing the setscrew to drop into the first guide hole one at a time.

6. The apparatus of claim 5, wherein said setscrew feeding means further includes a pair of stoppers, the stoppers being spaced apart from each other at a predetermined distance to thereby restrict the range of the rotation of the outer cylindrical member to 180 degrees.

7. The apparatus of claim 5, further comprising a sensor for checking whether or not the upper guide pipe is fully-filled with the setscrews, the sensor being disposed in the vicinity of an upper portion of the upper guide pipe.

* * * * *